United States Patent [19]

Maruyama

[11] Patent Number: 5,237,151
[45] Date of Patent: Aug. 17, 1993

[54] LASER PROCESSING APPARATUS
[75] Inventor: Yoichi Maruyama, Tokyo, Japan
[73] Assignee: Koike Sanso Kogyo Co., Ltd., Tokyo, Japan
[21] Appl. No.: 793,660
[22] Filed: Nov. 18, 1991
[30] Foreign Application Priority Data
  Nov. 19, 1990 [JP] Japan .................................. 2-311447
[51] Int. Cl.[5] .............................................. B23K 26/08
[52] U.S. Cl. ........................... 219/121.78; 219/121.74; 219/121.84
[58] Field of Search ...................... 219/121.68, 121.69, 219/121.78, 121.82, 121.63, 121.64, 121.72, 121.74, 121.84

[56] References Cited
U.S. PATENT DOCUMENTS
4,467,168  8/1984  Morgan et al. ................. 219/121.67
4,973,819  11/1960  Thatcher ......................... 219/121.78
5,089,683  2/1992  Stephenson et al. .......... 219/126.78

Primary Examiner—C. L. Albritton
Attorney, Agent, or Firm—Fitzpatrick, Cella, Harper & Scinto

[57] ABSTRACT

A laser processing apparatus is disclosed for use in cutting or welding relatively thick plates. The apparatus utilizes a laser beam applied to a plate in conjunction with a jet of gas to effect the cutting or welding action, and a movable mirror system is provided in the path of the laser beam. The mirror system is controlled so that as a device for applying the laser beam to the workpiece is moved with relation to the remainder of the apparatus, the mirror system is also moved to maintain constant the travelling distance for the laser beam. Therefore, a laser light distance between the laser oscillator and a plate can be maintained at a fixed length so that a laser spot diameter on the plate is constant as the laser light heats the plate in the thickness-direction.

2 Claims, 1 Drawing Sheet

LASER PROCESSING APPARATUS

BACKGROUND OF THE INVENTION

1. Field of the Invention

The present invention relates to a laser processing apparatus, and particularly to a processing apparatus for cutting and welding relatively thick steel plates and the like.

2. Description of the Prior Art

A laser beam can be used for cutting, welding, marking and the like of materials including ferrous metal such as steel plates and nonferrous metals such as aluminum, and for cutting and carving synthetic resin materials including acryl board and the like. The most commonly used laser oscillator has a comparatively small output, so that only the processing of a laminate can be performed. Recently, however, a laser oscillator having a more powerful output has been disclosed, so that processing of comparatively thick plates has become practicable.

For example, when a steel plate is to be cut using a laser, a condensing lens is provided for the laser beam and a torch is provided for jetting oxygen as an assistant gas. A spot is formed on the surface of the plate by condensing the laser-light with the lens, and the steel plate is cut by moving the light along a previously established cutting line while an oxygen gas is jetted against the laser spot. The cutting is enforced by continuously melting and evaporating the steel plate-basic material in accordance with the energy of the laser-light, and a sudden oxidation of the molten basic material occurs as a result of the oxygen gas so that removal of the oxidized product from the steel plate can be effected.

The laser-light radiated from the laser oscillator is not parallel and has a slightly extensive angle. Accordingly, when the distance between the laser oscillator and the torch is changed, the diameter of the spot which is formed on the steel plate is changed and cutting becomes inefficient. Therefore, in the laser processing apparatus for enforcing secondary cutting, welding, sculpture and the like, the condensing position of the laser-light toward the surface of the working material must be maintained at a fixed place so that the condensing light diameter (spot-diameter) of the laser-light must be maintained constant.

Generally, when cutting, welding and the like are performed using a laser beam, excellent efficiency is obtained by irradiating the laser-light to the working material in a thin, condensed state. However, as a result of work done by the present inventor, it became clear that the cutting of a thick plate cannot be performed satisfactorily using only the laser-light in a thin beam. In theory, when the laser light is irradiated to the steel plate and oxygen gas is jetted at the same time, energy is concentrated at the irradiation point of the laser-light, and melting and evaporation of the basic material can occur suddenly to a small extent. Thus, it is possible that combustion of the basic material can begin at this point. However, it is possible also that heating of the basic material may still be insufficient for melting and combustion.

SUMMARY OF THE INVENTION

A purpose of the present invention is to provide a laser processing apparatus which can smoothly cut or weld a thick plate.

To achieve this purpose, the laser processing apparatus of the present invention constitutes a laser oscillator for radiating a multi-mode laser-light, a torch for jetting an assistant gas along the beam of laser-light while irradiating the laser-light to the work material, a lens removably attached to the torch for condensing the laser light attached to the torch, a frame mounted to move along a rail for holding the torch perpendicularly to the rail while also supporting the laser oscillator, and a mirror system for directing the laser-light radiated from the laser oscillator toward the direction of the rail. The mirror system includes movable mirror elements for reversing the direction of travel of the laser beam, and a driving member for moving the reversal elements with relation to movement of the torch. In this laser processing apparatus, it is preferable to have a device for prescribing a moving range of the reversal elements in accordance with movement of the lens attached to the torch.

In accordance with the above-mentioned invention, it is possible to conduct the cutting, welding and the like of a thick plate smoothly while maintaining satisfactory quality.

The cutting of the steel plate consists of the physical process of melting and evaporating the basic material with the laser-light, and the chemical process of sudden oxidation of the molten basic material (combustion of the basic material) caused by oxygen gas. An oxidation product from the basic material is then removed. It is well known that heating the steel plate in the thickness direction is essential to continue combustion of the basic material. The width of the cutting groove grows larger with enlargement of the quantity of the oxidation product which is necessary with a thickening of the steel plate, and the steel plate is melted and evaporated by means of directing the largest energy portion in the radius direction of the laser-light.

The torch is movable in the direction of the rail and in the direction normal thereto while the combustion product is separated from the basic material by the oxygen gas. A molten portion is caused by radiating the laser-light while jetting the oxygen gas, so that it is possible to cut the thick plate to the desired shape.

The results of the present inventor's work confirm that it is necessary to maintain the distance between the laser oscillator and the torch at a fixed value. Therefore, the reversal mirror elements are used. The length of laser beam travel is adjusted by moving the reversal-element according to the moving quantity of the torch, thus the distance between the laser oscillator and the torch is maintained at a fixed length.

Furthermore, it has been confirmed that the distance between the laser oscillator and the torch must be changed in accordance with the focal distance of the lens attached to the torch. Therefore, it is possible that the most appropriate length for the laser-light course in accordance with the lens attached to the torch can be established by arranging the reversal elements within their range of movement.

DETAILED DESCRIPTION OF THE PREFERRED EMBODIMENT

Figure 1:
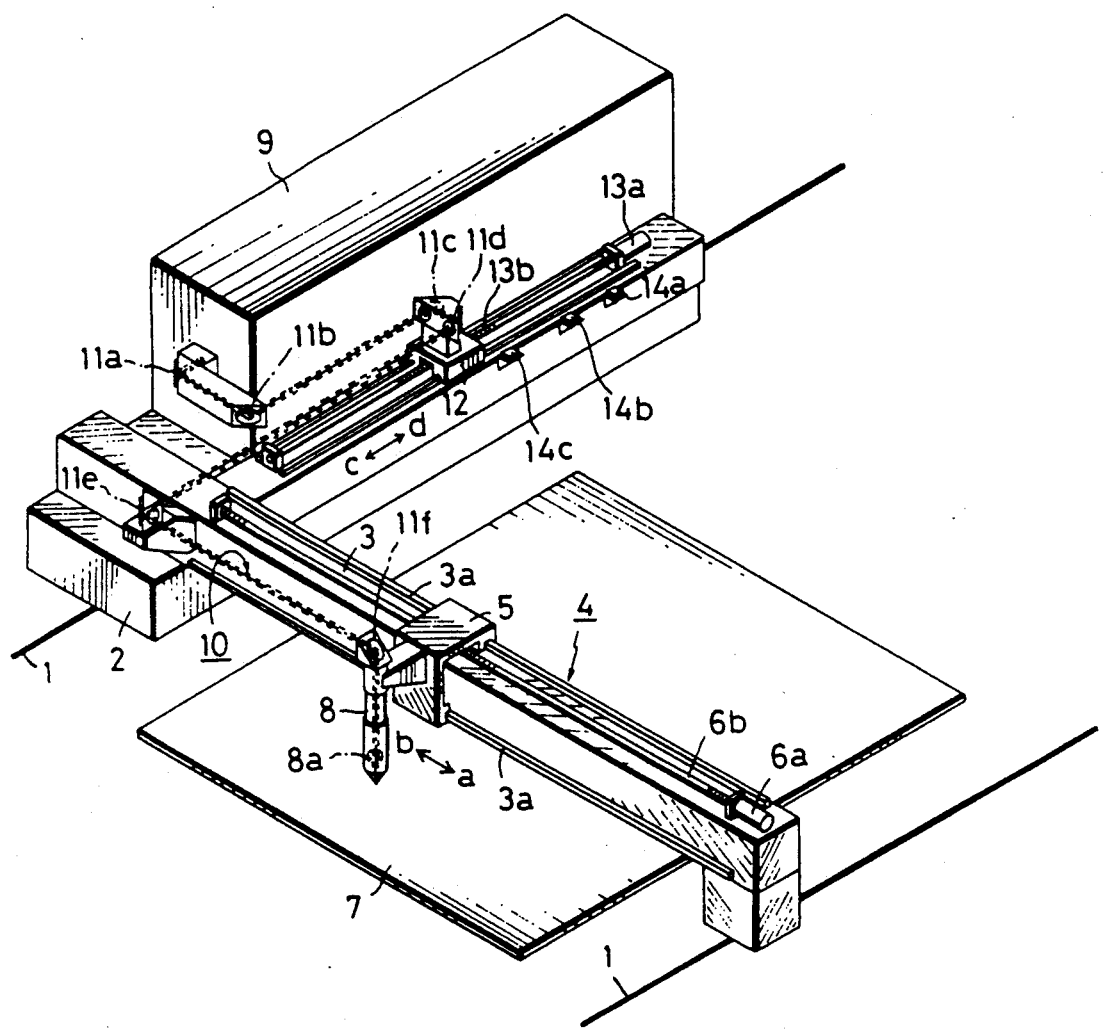
FIG. 1 is an entire perspective view of the laser processing apparatus in accordance with the present invention.

As shown in the drawing, a frame 4, composed of a saddle 2 and a cross-brace 3, is mounted for movement on a pair of rails 1 which are disposed in parallel with a work space therebetween. The Frame 4 moves in the constructing direction (direction X) of the rails 1 by means of a driving motor (not shown). The cross-brace 3 is arranged perpendicularly (direction Y) to the rail 1 and plural cross-rails 3a are provided on the cross-brace 3 along direction Y. A carriage 5 is arranged on the cross-brace 3a and moves along the cross-rails 3a by means of a screw 6b driven by a motor 6a mounted on the cross-brace 3.

A torch 8 jets oxygen gas from a supplying means (not shown) attached to the carriage 5, while the laser-light is radiated to a steel plate 7 placed between the rails 1 and below the carriage 5. Therefore, the torch 8 can be moved in both the X direction of the frame 4 and in the Y direction of the carriage 5.

A laser oscillator 9 for radiating the multi-mode laser beam is attached to the saddle 2. A laser optical path 10 is constituted by arranging an adjustable mirror system including plural mirrors 11a to 11f between the laser oscillator 9 and the torch 8. The distance between the laser oscillator 9 and the torch 8 continually maintains a fixed length because of this optical path 10.

A light reversal apparatus 12 is arranged on the saddle 2, and is constituted by oppositely arranged mirrors 11c, 11d. A driving member including a screw 13b is mounted on the saddle 2 for moving the reversal apparatus 12 with relation to movement of the torch 8.

The driving screw 13b is arranged parallel to the rail 1, and the reversal apparatus 12 moves in the direction of the rails 1 by means of a nut (not shown) fixed to the reversal apparatus 12 and threaded on the screw 13b. The reversal apparatus 12 is moved by driving the motor 13a in a fixed ratio with the driving quantity of the motor 6a, which moves the carriage 5. The distance between the laser oscillator 9 and the torch 8 is thereby maintained at a fixed length at all times. The reversal apparatus 12 moves in the direction of arrow c in response to a movement toward arrow a of the carriage 5. Further, the reversal apparatus 12 moves in the direction of arrow d in response to a movement toward arrow b of the carriage 5. By these means the reversal apparatus 12 need move only half the distance corresponding to movement of the torch 8 in the Y direction.

Therefore, the multi-mode laser-light radiated from the laser oscillator 9 is bent toward the direction of the rail 1 by mirrors 11a, 11b. The laser-light is then reversed in parallel with the rail 1 by the reversal apparatus 12, composed of mirrors 11c, 11d. The laser-light is then directed along the cross-brace 3 by mirror 11e and then along the torch axis by mirror 11f. The beam is then radiated to the steel plate 7 by a condensing lens 8a which is attached removably to the torch 8.

The lens is selected in accordance with characteristics such as thickness, quality and the like of the steel plate 7. For example, a lens having a focal distance of 10 inches, 7.5 inches or 5 inches can be attached to the torch 8 as desired. When the focal distance of the lens 8a is varied, it becomes necessary for the distance between the laser oscillator 9 and the torch 8 to change in response to the variation in the focal distance. In the present embodiment sensors 14a to 14c are used for prescribing the moving range of the reversal apparatus 12, and the sensors are arranged in the neighborhood of the driving screw 13b. These sensors 14a to 14c make it possible to use a switch to generate a signal for detecting a non-contact or contact state of the reversal apparatus 12. The sensor 14b is set at the position corresponding to a lens having a focal distance of 7.5 inches. The sensor 14a is set at the position corresponding to the distance between the torch 8 and the laser oscillator 9, when the lens has a focal distance of 10 inches, and sensor 14c is set at the position corresponding to a lens having a focal distance of 5 inches. Input data concerning the focal distance of the lens 8a is processed by a controlling portion (not shown), so that the distance between the laser oscillator and the torch 8 is maintained at the optimum distance in regard to the lens 8a by selecting one of the sensors 14a to 14c.

In the present embodiment revolving directions and quantities of revolution for a motor (not shown) for moving the frame 4, motor 6a for moving the carriage and motor 13a for moving the reversal apparatus 12 are controlled by the numerical control apparatus, which controls the moving direction and moving velocity of the torch 8 in response to the diagrammatic information, plate-thickness information and the like previously input.

After this information is processed, the steel plate 7 is ready to be cut by the laser processing apparatus mentioned above. The torch 8 is moved to a desired position with relation to the steel plate 7, and the laser beam is radiated from the laser oscillator 9, while at the same time cutting is started by jetting oxygen gas as an assistant gas. A fixed diagram is cut by moving the torch 8 in the directions of X and Y in response to input information for movement of the frame 4 and the carriage 5. The distance between the laser oscillator 9 and the torch 8 is maintained at a fixed length by moving the reversal apparatus 12 with the driving motor 13a in response to the moving quantity in the direction Y of the carriage 5.

In the present embodiment, a single group of reversal mirror elements is arranged on apparatus 12 on the saddle 2, but it is also satisfactory if the reversal apparatus 12 includes additional groups of elements.

When the steel plate 7 is a welding member, a welding operation can be performed by using the laser-light together with an inert gas including argon gas, carbonic acid gas and the like which is used as the assistant gas.

What is claimed is:

1. A laser processing apparatus, comprising;
    a laser oscillator for radiating a multi-mode laser beam;
    a mirror system for directing the laser beam to impinge on a workpiece;
    a torch for jetting an assistant gas toward the workpiece at a position coinciding with the impingement of the laser beam;
    a support member mounted for movement along a rail wherein said oscillator is mounted on said support member, a frame held by said support member for movement therewith, said torch being held on said frame for movement in a direction perpendicular to said rail;

wherein said mirror system includes movably mounted laser beam reversal elements for reversing a heading direction of said laser beam, means for driving said reversal elements with respect to a movement of said torch in the direction perpendicular to the rail and a group of lenses respectively having different focal length, a lens selected from said group of lenses being attached to said torch in accordance with properties of the workpiece such as thickness, composition and the like.

2. A laser processing apparatus according to claim 1, further including means for defining a moving range of said laser beam reversal elements with relation to a focal length of said lens attached to said torch.

* * * * *

UNITED STATES PATENT AND TRADEMARK OFFICE
CERTIFICATE OF CORRECTION

PATENT NO. : 5,237,151

DATED : August 17, 1993

INVENTOR(S) : YOICHI MARUYAMA

It is certified that error appears in the above-identified patent and that said Letters Patent is hereby corrected as shown below:

COLUMN 4

Line 54, "comprising;" should read --comprising:--.

COLUMN 5

Line 7, "length," should read --lengths,--.

COLUMN 6

Line 2, "thickness, composition and the like." should read --thickness and composition.--.

Signed and Sealed this

Twentieth Day of May, 1997

Attest:

BRUCE LEHMAN

Attesting Officer　　Commissioner of Patents and Trademarks